United States Patent [19]

Vasta

[11] Patent Number: 4,727,099
[45] Date of Patent: Feb. 23, 1988

[54] COATING COMPOSITION CONTAINING A REACTIVE URETHANE COMPONENT, A HYDROXYL CONTAINING ACRYLIC POLYMER HAVING PENDENT ESTER GROUPS AND A METALLIC ALKYLATE CATALYST

[75] Inventor: Joseph A. Vasta, Wilmington, Del.

[73] Assignee: E. I. Du Pont de Nemours and Company, Wilmington, Del.

[21] Appl. No.: 897,039

[22] Filed: Aug. 15, 1986

[51] Int. Cl.$^4$ ............................................. C08G 18/40
[52] U.S. Cl. ....................... 524/40; 524/102; 524/336; 524/337; 525/127; 528/45; 528/48; 528/58; 528/272; 528/279; 528/280; 528/282
[58] Field of Search ................. 524/102, 336, 337, 40; 525/127; 528/45, 48, 58, 272, 279, 280, 282

[56] References Cited

U.S. PATENT DOCUMENTS

| | | | |
|---|---|---|---|
| 3,558,564 | 1/1971 | Vasta | 528/58 |
| 3,622,651 | 1/1971 | Vasta | 260/856 |
| 3,719,619 | 3/1973 | Nagata et al. | 260/22 CB |
| 3,993,849 | 11/1976 | Victorius | 528/45 |
| 3,998,768 | 12/1976 | Pettit, Jr. | 528/45 |
| 4,020,216 | 4/1977 | Miller | 428/425 |
| 4,131,571 | 12/1978 | Crawley et al. | 260/17 R |
| 4,215,023 | 7/1980 | Strolle | 260/22 CB |
| 4,373,081 | 2/1983 | Nachtkamp et al. | 528/45 |
| 4,555,535 | 11/1985 | Bednarek et al. | 524/40 |

OTHER PUBLICATIONS

"Reactions of Diethyl Malonate Blocked Cyclohexyl Isocyanate", Wicks et al, Journal of Coatings Technology, Nov. 1977, vol. 49, No. 634, pp. 77–84.
"Malonic Ester-Blocked Aliphatic Isocyanates", Kostyk & Wicks, Journal of Polymer Science, Polymer Chemistry Edition, vol. 17, 2423–2428 (1979).
"Reactions of Acetoacetic Ester Blocked Cyclohexyl Isocyanate", Wicks & Wu, Journal of Organic Chemistry, 45, 2446 (1980).
Hüls Data Sheet 2297, 9/1983.

Primary Examiner—Maurice J. Welsh
Assistant Examiner—S. A. Acquah
Attorney, Agent, or Firm—Hilmar L. Fricke

[57] ABSTRACT

A coating composition containing a film forming binder and a carrier for the binder; wherein the binder consists essentially of (1) a reactive polyurethane of the formula

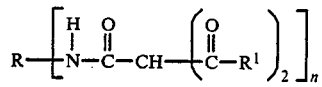

where
R is a divalent or trivalent aliphatic or cycloaliphatic group,
R$^1$ is an alkyl group having 1–4 carbon atoms, n is 2–3;
(2) a hydroxy containing polymer having a hydroxyl number of 50–200 and having pendent ester groups;
(3) an organo metallic alkylate catalyst selected from the group of an aluminum alkylate, zirconium alkylate, titanium alkylate or mixtures thereof.

The composition can be applied by conventional techniques such as spraying and can be cured at relatively low baking temperatures.

14 Claims, No Drawings

COATING COMPOSITION CONTAINING A REACTIVE URETHANE COMPONENT, A HYDROXYL CONTAINING ACRYLIC POLYMER HAVING PENDENT ESTER GROUPS AND A METALLIC ALKYLATE CATALYST

BACKGROUND OF THE INVENTION

This invention is related to a coating composition that is useful for finishing and refinishing automobiles and trucks.

Acrylic polyurethane coating compositions for automobiles and trucks are well known in the art. An acrylic polyurethane composition described in Vasta U.S. Pat. No. 3,558,564 issued Jan. 26, 1971 has been widely used for finishing and refinishing automobiles and trucks. Other high quality acrylic polyurethane finishes used for automobiles and trucks are shown in Crawley et al. U.S. Pat. Nos. 4,131,571, issued Dec. 26, 1978 and Bednarek et al. 4,555,535 issued Nov. 26, 1985.

A coating composition that is free from reactive isocyanate groups but will crosslink and cure at relative low baking temperatures in a short time period and that will form a glossy, durably, hard, weatherable finish will have many uses in finishing and refinish automobiles and trucks. Such a composition will be particularly useful for finishing certain plastic parts which are readily deformed by elevated baking temperatures. In each model year, the amount of plastic parts used in cars and trucks becomes larger thereby increasing the need for a composition that will cure at low temperatures.

SUMMARY OF THE INVENTION

A coating composition containing a film forming binder and a carrier for the binder; wherein the binder consists essentially of (1) a reactive component of the formula

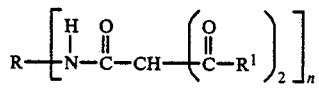

where

R is a divalent or trivalent aliphatic or cycloaliphatic group, $R^1$ is an alkyl group having 1-4 carbon atoms, n is 2-3;

(2) a hydroxy containing acrylic polymer having a hydroxyl number of 50-200 and a weight average molecular weight of about 1,000-60,000 and having a backbone of polymerized monomers of the group of styrene, alkyl methacrylate, alkyl acrylate or mixtures thereof, each having 1-12 carbon atoms in the alkyl groups and having polymerized ethylenically unsaturated ester units that form ester groups pending from the carbon atoms of the backbone that comprise about 10 to 75% of the total weight of the polymer and are of Ester Group (A)

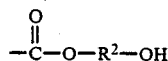

and Ester Group (B) which is either

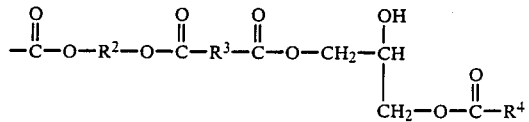

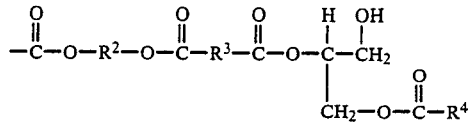

or a mixture of these groups; wherein the molar ratio of ester group (A) to ester group (B) is from about 1:15 to 1:2.5; and wherein $R^2$ is a saturated hydrocarbon radical having carbon atoms $R^3$ is an alkylene, vinylene, aromatic, carboxylic or heterocyclic radicals, and $R^4$ is a saturated aliphatic hydrocarbon group;

(3) an organo metallic alkylate catalyst selected from the group of an aluminum, titanium and zirconium alkylate or mixtures thereof.

DETAILED DESCRIPTION OF THE INVENTION

The coating composition of this invention does not contain free isocyanate groups and forms a high quality, glossy, hard, durable and weatherable finish that has excellent adhesion to primed metal substrates and rigid and flexible plastic substrates. The composition cures at low baking temperatures of about 50°-120°C.

The coating composition preferably has a film forming binder content of about 10-80%, by weight and correspondingly, contains about 20-90%, by weight of an organic carrier which preferably, is a solvent for the binder. A high solids coating composition can be formed that has a solids content of about 50-80% by weight of binder and about 20-50% by weight of an organic solvent for the binder.

Preferably, the binder of the coating composition contains about (1) 5-38% by weight, based on the weight of the binder, of the reactive component, (2) 60-94.99% by weight, based on the weight of the binder, of the hydroxyl containing acrylic polymer and (3) 0.01-2% by weight, based on the weight of the binder, of the organo metallic alkylate catalyst.

The reactive component is formed by reacting all of the isocyanate groups of an aliphatic or cycloaliphatic polyisocyanate with a dialkyl malonate. The above constituents are mixed with conventional solvents and reacted at about 50°-200° C. for about 0.5-4 hours to form the reactive component.

Typical dialkyl malonates that can be used are dimethyl malonate, diethyl malonate, dipropyl malonate, diisopropyl malonate, dibutyl malonate, diisobutyl malonate, methyl ethyl malonate and the like. Diethyl malonate is preferred for forming a high quality reactive component.

Typical aliphatic and cycloaliphatic polyisocyanates that can be used to form the reactive component are as follows: isophorone diisocyanate which is 3-isocyanatemethyl-3,3,3-trimethyl-cyclohexyl-isocyanate, propylene-1,2-diisocyanate, butylene-1,2-diisocyanate, butylene-1,3-diisocyanate, hexamethylene diisocyanate, octamethylene diisocyanate, 2,4,4-trimethylhexamethylene diisocyanate, nonamethylene diisocyanate, 2,2,4-trimethylhexamethylene diisocyanate, decamethylene diisocyanate, 2,11-diisocyano-dodecane and the like; 2,2'-methylene-bis-(cyclohexyl isocyanate), 3,3'-methylene-bis-(cyclohexyl isocyanate), 4,4'-methylene-bis-(cyclohexyl isocyanate), 4,4'-ethylene-bis-(cyclohexyl isocyanate), 4,4'-propylene-bis-(cyclohexyl isocyanate), biurets such as

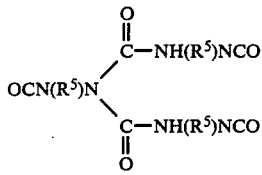

wherein $R^5$ is an aliphatic hydrocarbon group having 1-12 carbon atoms. One particularly preferred biuret is the biuret of hexamethylene diisocyanate. These biurets can be made according to Mayer et al. U.S. Pat. No. 3,245,941, issued Apr. 12, 1966.

Trimers of aliphatic or cycloaliphatic diisocyanate can be used. One particularly preferred polyisocyanate that forms a high quality durable and weatherable finish is

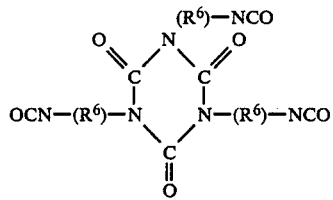

wherein $R^6$ is a cycloaliphatic or aliphatic hydrocarbon group. The above polyisocyanate is 1,3,5-tris(6-isocyanatohexyl) 1,3,5-triazine 2,4,6(H,3H,5H) trione. Commercially available polyisocyanate compositions contain the above polyisocyanate and small amounts of higher molecular weight moieties such as dimers and hexamers of the above polyisocyanate.

One particularly preferred reactive component is formed from the trimer of hexamethylene diisocyanate and diethyl malonate or dimethyl malonate.

The hydroxyl containing acrylic polymer has a hydroxyl number of about 20-200 and preferably, about 50-150. The polymer has a weight average molecular weight of about 1,000-60,000, preferably about 20,000-40,000.

Molecular weight is determined by gel permeation chromatography using polymethyl methacrylates as a standard.

The hydroxyl containing acrylic polymer and preparation thereof is described in Vasta U.S. Pat. Nos. 3,558,564 issued Jan. 26, 1971 and Vasta 3,622,651 issued Nov. 23, 1971 which are hereby incorporated herein by reference.

One method for preparing the hydroxyl containing acrylic polymer used in this invention is to first form Ester Group (B) by reacting in about an equal molar ratio hydroxy alkyl acrylate or methacrylate monomers, an anhydride and a glycidyl ester. This esterification product is then reacted with backbone monomers and additional hydroxy alkyl acrylate or methacrylate monomers, which form Ester Group (A) to form the hydroxyl containing acrylic polymer.

As a typical example, a hydroxyalkyl acrylate or methacrylate, aromatic anhydride and a glycidyl ester are charged into a reaction vessel with a suitable solvent, such as toluene, xylene, acetone or an aromatic solvent and the mixture is heated to its reflux temperature, which is about 80° to 200° C., for about 30 minutes to 3 hours. The backbone constituents of the novel polymer, such as styrene, methyl methacrylate and a hydroxalkyl acrylate with a suitable polymerization catalyst, such as tertiary butyl peroxide, are then slowly added over a 1-4 hour period. The reaction mixture is heated to its reflux temperature which is about 80° to 200° C. for about 30 minutes to 5 hours, preferably 2-4 hours until a polymer is formed that has the desired molecular weight. Additional solvent may then be added to dilute the polymer solution.

If the reaction rates of the monomer components used to form the polymer are suitable, all of the monomers can be charged into a reaction vessel with a suitable solvent and polymerization catalyst and heated to the reflux temperature which is about 80° to 200° C. for 60 minutes to 5 hours.

Another method of preparing the hydroxyl containing acrylic polymer of this invention is to charge the anhydride, for example, phthalic anhydride, into a reaction vessel with a suitable solvent and heat the mixture for about 30 minutes to effect solution of the anhydride. The other monomer constituents with a suitable polymerization catalyst are then slowly added over a 1-4 hour period into the reaction vessel while maintaining a reflux temperature which is about 80°-200° C. After the above ingredients have been added, the reaction mixture is maintained at its reflux temperature for an additional 30 minutes to about 5 hours.

Suitable solvents which are used to prepare the polymer are toluene, xylene, butyl acetate, acetone, methylisobutyl ketone, methylethyl ketone, and other aliphatic cycloaliphatic and aromatic hydrocarbons, esters, ethers, ketones and other solvents which are nonreactive with the monomers used to form the polymer such as are conventionally used in coating compositions.

Suitable polymerization catalysts that are used in the process to prepare the hydroxy containing acrylic polymer are tertiary butyl peroxide, cumene hydroperoxide, azobisisobutyronitrile and the like. To prepare the Ester Group (B) esterification catalysts, such as quaternary bases or salts as benzyltrimethylammonium hydroxide, benzyltrimethylammonium chloride, octadecyltrimethylammonium chloride, or an amine, such as triethylamine, can be used.

Typical monomers used to form the backbone of the hydroxy containing acrylic polymer are as follows: styrene, alkyl methacrylate having 1-12 carbon atoms such as methyl methacrylate, ethyl methacrylate, propyl methacrylate, butyl methacrylate, isobutyl methacrylate, pentyl methacrylate, hexyl methacrylate, ethyl hexyl methacrylate, nonyl methacrylate, decyl methacrylate lauryl methacrylate, alkyl acrylates having 1-12 carbon atoms in the alkyl group such as methyl acrylate, ethyl acrylate, propyl acrylate, butyl acrylate, isobutyl acrylate, pentyl acrylate, hexyl acrylate, ethyl hexyl acrylate, nonyl acrylate, decyl acrylate, lauryl acrylate.

Ester Group (B) is the esterification product of the aforementioned hydroxyalkyl monomers, an anhydride of a dicarboxylic acid and a glycidyl ester. This ester group is polymerized into the polymer backbone through the ethylenic unsaturation of the aforementioned hydroxyalkyl monomers.

The anhydride used for forming Ester Group (B) has the formula

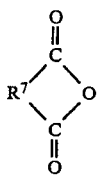

wherein $R^7$ is either alkylene, vinylene, aromatic, carbocyclic or a heterocyclic radical. The anhydride reacts with the hydroxyalkyl monomer and also reacts with the glycidyl ester to form Group (B).

Anhydrides useful in this invention in which $R^7$ is an alkylene group are formed from dicarboxylic acids of the general formula $(CH_2)n(COOH)_2$ where n is from two to 10. Typical dicarboxylic acids of this group are glutaric, adipic, pimelic, succinic acids and the like. The preferred is an anhydride of succinic acid.

Useful anhydrides in which $R^7$ is a vinylene group are derived from dicarboxylic acids of the general formula $$c_n-H(2_n-4)O_4$$

wherein n is from four to 10. Typical dicarboxylic acids of this group are maleic and itaconic acids.

Another group of useful anhydrides are derived from dibasic aromatic acids, such as phthalic acid, uvitic acid and cumidinic acid. Often it is desirable to use a halogen substituted anhydride of one of the above aromatic dicarboxylic acids, such as tetrabromo phthalic anhydride. Halogen substituted anhydrides in which the halogen substitutuent is either chlorine, bromine or fluorine are particularly useful in forming fire retardant coating compositions.

Anhydrides in which $R^7$ is a carbocyclic radical are useful such as hexahydrophthalic anhydride, or tetrahydrophthalic anhydride.

The glycidyl ester used for forming Ester Group (B) has the formula

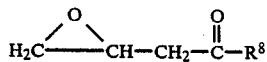

where $R^8$ is a saturated aliphatic hydrocarbon group preferably containing one to 26 carbon atoms, or $R^8$ can be an ethylenically unsaturated aliphatic hydrocarbon radical of 12-18 carbon atoms derived from a drying oil fatty acid.

One particularly preferred glycidyl ester of this group because it imparts acid and alkali resistance to the final product is a mixed glycidyl ester described in U.S. Pat. No. 3,275,583, issued Sept. 27, 1966, and is manufactured and sold by the Shell Chemical Company Company as "Cardura" E ester. This glycidyl ester is of synthetic tertiary carboxylic acid and has the general formula

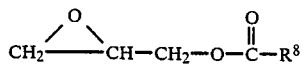

where $R^8$ is a tertiary aliphatic hydrocarbon group of eight to ten carbon atoms.

Preferably, the acrylic polymer contains a molar ratio of ester group (A) to ester group (B) of about 1:1 to 1:2.5.

To enhance the polymer about 0.0-1% by weight of a polyamine having the formula

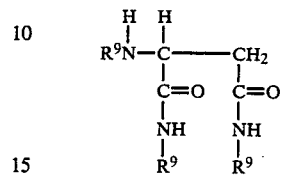

where $R^9$ is $R^{10}NH_2$, and $R^{10}$ is an aliphatic or cycloaliphatic hydrocarbon radical.

The polyamine (1) is prepared by reacting 1 mole of dialkyl maleate with 3 moles of an aliphatic or cycloaliphatic amine at about 100°-150° C. for about 2-4 hours. Preferably, the above constituents are in an alkanol solvent such as methanol, propanol isopropanol and the like.

One preferred polyamine is the reaction product of isophorone diamine and dimethyl maleate.

The organo metallic alkylate catalyst generally is used in an amount of about 0.01-2% by weight based on the weight of the binder in the coating composition.

The metallic alkylate has the formula $M(OR^{11})n$ where M is a metal selected from the group of titanium, zirconium and aluminum, $R^{11}$ is an alkyl group having 1-8 carbon atoms and n is 3 or 4. Typical catalysts are zirconium alkylate, such as zirconium tetraisobutoxide and zirconium tetrabutoxide, titanium alkylate, such as titanium tetra isobutoxide and titanium tetrabutoxide; aluminum alkylate such as aluminum triisobutoxide. Mixtures of any of the aforementioned alkylates can be used to effect different cure rates. One particularly useful catalyst is a mixture of an aluminum alkylate such as aluminum triisobutoxide and an aluminum alkyl ester such as aluminum triethyl acetoacetate.

To slow the reaction rate of the composition and increase pot life small amounts of 2,4-pentane dion (acetyl acetone) can be added. Typically about 0.1 to 2% by weight, based on the weight of the binder, is added.

The coating composition is usually pigment. Pigments are added in a pigment to binder weight ratio of about 0.5/100 to 200/100 where the binder is the film forming polymer constituent of the coating composition. The pigments are usually dispersed with a resin to form a pigment dispersion. The aforementioned polymer or another compatible dispersion resin can be used. The pigment dispersion is then added to the coating composition.

Typical pigments that are used in the coating composition are metallic oxides such as titanium dioxide, iron oxide, zinc oxide, and the like, metallic flakes such as aluminum flake, bronze flake, nickel flake, metallic powders, metallic hydroxide, phthalocyanine pigments. "Monastral" pigments, molybdate pigments such as molybdate orange pigment, quinacridone pigments, sulfate pigments, carbonate pigments, carbon black pigments, silica pigments and other organic and inorganic pigments commonly used in coatings.

The coating composition is applied to a substrate by conventional techniques such as spraying, electrostatic spraying, brushing, dipping, roller coating, coil coating and the like. The coating composition can be applied to treated and untreated metal substrates, primed metal substrates, phosphatized steel substrates, primed phosphatized steel substrates, plastic substrates, reinforced injection molded substrates, polyamide substrates and the like. The coating can be baked at about 50°–150° C. to cure the coating. Preferably, the composition is baked at about 120° C. for about 30 minutes to achieve maximum properties. Finishes of the cured coating are about 0.5 mils in thickness.

The composition can be used as an exterior original equipment finish for automobiles and trucks since the composition can be applied by conventional techniques such as spraying or electrostatic spraying and can be cured at low baking temperatures. The composition is particularly useful for finishing plastic parts and laminated structure used in automobiles and trucks since elevated temperatures which deform the plastic parts are not used to cure the composition. Also, the aformentioned characteristics make the composition very useful for refinishing automobiles and trucks since many refinish operations only have low temperature baking facilities.

The composition can be a clear non-pigmented composition that is applied over a pigmented finish and then dried to form a clear coat/clor coat finish. Also, the color coat can be the pigmented composition of this invention. To improve weatherability of the clear finish of the coating composition, and also of the pigmented finish, about 0.1–5%, by weight, based on the weight of the binder, of a light stabilizer or a combination of ultraviolet light absorbers and stabilizers can be added. These stabilizers include ultraviolet light absorbers, screeners, quencher such as hindered amine light stabilizers. Also, about 0.1–5% by weight, based on the weight of the binder, of an antioxidant can be added.

The following examples illustrate the invention. All parts and percentages are on a weight bases unless indicated otherwise. Molecular weights (Mw) are determined by gel permeation chromatography using polymethyl methacrylate as the standard.

EXAMPLE 1

A polymer solution is formed by reacting the following ingredients:

| | Parts by Weight |
|---|---|
| Portion 1 | |
| Xylol | 415.39 |
| Hydroxyethyl acrylate | 218.50 |
| Phthalaic anhydride | 269.50 |
| "Cardura" E ester (a mixed ester described in U.S. Pat. No. 3,275,583, issued September 27, 1966, and is a glycidyl ester of a synthetic tertiary carboxylic acid of the formula: | 481.25 |

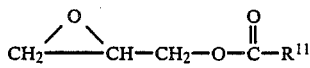

| where R$^{11}$ is a tertiary aliphatic hydrocarbon group of 8–10 carbon atoms) | |
|---|---|
| Portion 2 | |
| Xylol | 621.15 |
| Portion 3 | |
| Styrene | 567.88 |
| Methyl methacrylate | 288.74 |

| | Parts by Weight |
|---|---|
| Hydroxyethyl acrylate | 99.13 |
| Tertiary butyl peroxide | 17.33 |
| Portion 4 | |
| Xylol | 363.13 |
| Methoxy propyl glycol acetate | 158.00 |
| Total | 3,500.00 |

Portion 1 is charged into a reactor equipped with a reflux condenser and is heated to a reflux temperature and is held at this temperature for about 1 hour. Portion 2 is then added and the mixture is heated to its reflux temperature. Portion 3 is premixed and slowly added over a 3-hour period while maintaining the reflux condition and then the reaction mixture is held at the reflux temperature for an additional 3 hours. The heat is removed from the reaction vessel and Portion 4 is added.

The resulting polymer solution has a solids content of about 55 percent and a Gardner Holdt viscosity measured at 25° C. of about X. The polymer is the copolymerization and esterification product of the following reactants contain the above-described Ester Groups A and B:

| | Parts By Weight |
|---|---|
| Styrene | 29.5 |
| Methyl methacrylate | 15.0 |
| Hydroxyethyl acrylate | 16.5 |
| Phthalic anhydride | 14.0 |
| "Cardura" E ester | 25.0 |
| Total | 100.0 |

The polymer has a weight average molecular weight of about 20,000 measured by gel permeation chromatography and a hydroxyl number of 90.

A coating composition was prepared as follows:

| | Parts By Weight |
|---|---|
| Portion 1 | |
| Titanium dioxide pigment | 80.00 |
| Polymer solution (prepared above) | 109.09 |
| Reactive component solution (75% solids in xylene/methoxy propyl glycol acetate of the reaction product of diethyl malonate and trimer of hexamethylene diisocyanate) | 53.33 |
| Toluene | 20.00 |
| Butyl acetate | 20.00 |
| Fluoride FC 430 Flow Agent (2% solution (in xylene of a fluorosilicone) | 2.50 |
| Portion 2 | |
| ALUSEC 588 Aluminum alkoxide (80% solution in isobutanol of aluminum tri-isobutoxide and aluminum triethyl aceto acetate) | 1.41 |
| Total | 288.08 |

Portion 1 was charged into a ball mill and ground for 36 hours and then removed from the mill and Portion 2 was added and thoroughly mixed with Portion 1. The resulting coating composition had a solids content of about 65%.

The coating composition was reduced to a spray viscosity of 30 seconds measured with a #2 Zahn cup with a 50/50 mixture of methyl ethyl ketone and toluene. The coating was sprayed onto plastic panels and steel panels that were each primed with an epoxy primer. The panels were baked at 120° C. for ¼ hour. The resulting finish on each panel had a good gloss, was hard and solvent resistant. The panels had a Tukon hardness of about 10 knoops and was resistant to methyl ethyl ketone solvent.

A second coating composition was prepared using the above constituents except the following constituents were used for Portion 2: titanium tetraisobutoxide 0.50 parts by weight and acetyl acetone 1.75 parts by weight.

The coating was reduced to a spray viscosity as above and sprayed onto plastic panels and primed steel panels described above. The panels were baked at 65° C. for 1 hour. The resulting finish on each of the panels was glossy, hard and solvent resistant.

A third coating composition was prepared using the above constituents except the following constituents were used for Portion 2: zirconium tetraisobutoxide 0.50 parts by weight and acetyl acetone 1.75 parts by weight.

The coating was reduced to a spray viscosity as above and sprayed onto plastic panels and primed steel panels described above. The panels were baked at 65° C. for 1 hour. The resulting finish on each of the panels was glossy, hard and solvent resistant.

I claim:

1. A coating composition containing 10-80% by weight of a film forming binder and 20-90% by weight of an organic solvent; wherein the binder consists essentially of
   (1) 5-38% by weight, based on the weight of the binder, of a reactive component of the formula

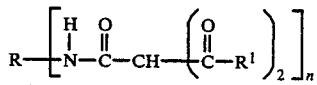

where
   R is a divalent or trivalent aliphatic or cycloaliphatic group,
   $R^1$ is an alkyl group having 1-4 carbon atoms,
   n is 2-3;
   (2) 60-94.99% by weight, based on the weight of the binder, of a hydroxy containing acrylic polymer having a hydroxyl number of 50-200 and a weight average molecular weight of about 1,000-60,000 and having a backbone of polymerized monomers of the group of styrene, alkyl methacrylate, alkyl acrylate or mixtures thereof, each having 1-12 carbon atoms in the alkyl groups and having polymerized ethylenically unsaturated ester units that form ester groups pending from the carbon atoms of the backbone that comprise about 10 to 75% of the total weight of the polymer and are of Ester Group (A)

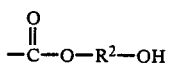

and Ester Group (B) selected from the group consisting of

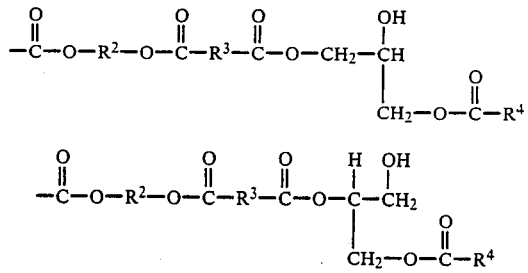

or a mixture of these groups; wherein the molar ratio of ester group (A) to ester group (B) is from about 1:15 to 1:2.5; and wherein
   $R^2$ is a saturated hydrocarbon radical having carbon atoms,
   $R^3$ is an alkylene, vinylene, aromatic, carboxylic or heterocyclic radicals, and
   $R^4$ is a saturated aliphatic hydrocarbon group; and
   (3) 0.01-2% by weight, based on the weight of the binder, of an organo metallic alkylate catalyst selected from the group of an aluminum alkylate, titanium alkylate, zirconium alkylate and mixtures thereof;
said composition being cureable without the formation of free isocyanate groups during curing.

2. The coating composition of claim 1 containing pigment in a pigment to binder ratio of 0.5/100 to 200/100.

3. The coating composition of claim 1 in which the organo metallic alkylate catalyst consists essentially of a mixture of an aluminum alkylate and aluminum alkyl ester.

4. The coating composition of claim 1 in which the organo metallic catalyst consists of titanium alkylate.

5. The coating composition of claim 1 in which the organo metallic catalyst consists essentially of zirconium alkylate.

6. The coating composition of claim 1 containing in addition about 0.01-1% by weight, based on the weight of the binder of a polyamine having the formula

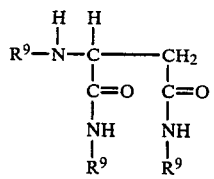

wherein $R^9$ is $R^{10}NH_2$, $R^{10}$ is an aliphatic or cycloaliphatic hydrocarbon radical.

7. The coating composition of claim 1 in which R of the reactive component is a divalent aliphatic group having 2-8 carbon atoms, $R^1$ is an alkyl group having 1-4 carbon atoms, and n is 2.

8. The coating composition of claim 1 in which the hydroxyl containing polymer has a weight average molecular weight of about 20,000 to 40,000 and has a backbone of polymerized methyl methacrylate monomers and styrene monomers, $R^2$ of Ester Group A is $(CH^2)_2$, $R^3$ is an aromatic radical, $R^4$ of Ester Group B is a tertiary aliphatic radical having 8-10 carbon atoms.

9. The coating composition of claim 8 in which the organo metallic alkylate catalyst consists essentially of a mixture of aluminum alkylate and aluminum alkyl ester.

10. The coating composition of claim 8 in which the organic metallic alkylate catalyst consists essentially of titanium tetraisobutoxide.

11. The coating composition of claim 8 in which the organic metallic alkylate catalyst consists essentially of zirconium tetraisobutoxide.

12. A substrate coated with a dried and cured layer of the composition at claim 1.

13. The coated substrate of claim 12 in which the substrate is a metal coated with a primer layer.

14. The coated substrate of claim 12 in which the substrate is a plastic.

* * * * *